(12) United States Patent
Schneider

(10) Patent No.: US 12,337,471 B2
(45) Date of Patent: Jun. 24, 2025

(54) TOOL INTERFACE AND ROBOT WITH SUCH A TOOL INTERFACE

(71) Applicant: IPR-Intelligente Peripherien für Roboter GmbH, Eppingen (DE)

(72) Inventor: Helge Schneider, Brackenheim (DE)

(73) Assignee: IPR—Intelligente Peripherien für Roboter GmbH, Eppingen (DE)

( * ) Notice: Subject to any disclaimer, the term of this patent is extended or adjusted under 35 U.S.C. 154(b) by 0 days.

(21) Appl. No.: 18/318,784

(22) Filed: May 17, 2023

(65) Prior Publication Data

US 2023/0415357 A1    Dec. 28, 2023

(30) Foreign Application Priority Data

Jun. 23, 2022   (EP) ..................... 22180803

(51) Int. Cl.
*B25J 19/00* (2006.01)
*B25J 15/04* (2006.01)
*B25J 11/00* (2006.01)

(52) U.S. Cl.
CPC ........... *B25J 19/0058* (2013.01); *B25J 15/04* (2013.01); *B25J 15/0416* (2013.01); *B25J 15/045* (2013.01); *B25J 15/0458* (2013.01); *B25J 19/0029* (2013.01); *B25J 19/0033* (2013.01); *B25J 19/0075* (2013.01); *B25J 11/005* (2013.01)

(58) Field of Classification Search
CPC .... B25J 11/005; B25J 15/0416; B25J 15/045; B25J 15/0458; B25J 19/0033; B25J 19/0058; B25J 19/0075
See application file for complete search history.

(56) References Cited

U.S. PATENT DOCUMENTS

| 4,525,918 | A |   | 7/1985  | Puritz |   |
|-----------|---|---|---------|--------|---|
| 4,706,510 | A | * | 11/1987 | Zimmer | B23Q 11/085 74/89.21 |
| 4,864,714 | A | * | 9/1989  | Von Haas | B23Q 17/003 409/137 |
| 4,875,275 | A | * | 10/1989 | Hutchinson | B25J 15/04 279/93 |

(Continued)

FOREIGN PATENT DOCUMENTS

DE          3214025 A1   10/1983
DE     102020100682 A1    7/2021

(Continued)

OTHER PUBLICATIONS

EP 2716418 B1 English Translation (Year: 2019).*

(Continued)

*Primary Examiner* — Joseph Brown
(74) *Attorney, Agent, or Firm* — FLYNN THIEL, P.C.

(57) ABSTRACT

A tool interface for coupling a tool to a robot. The tool interface has an abutment face for abutting a corresponding abutment face of the tool, and a coupling device for mechanically coupling the tool to the tool interface. A discharge device is provided for producing a discharge air flow in the region of the abutment face. The discharge device has a plurality of nozzle openings for discharging the discharge air flow, and the nozzle openings are supplied with compressed air by a common compressed air connection of the tool interface.

18 Claims, 3 Drawing Sheets

(56) References Cited

U.S. PATENT DOCUMENTS

| | | | | | |
|---|---|---|---|---|---|
| 5,372,567 | A | * | 12/1994 | Whittington | B23Q 11/005 |
| | | | | | 219/86.8 |
| 6,059,702 | A | * | 5/2000 | Winkler | B23Q 3/157 |
| | | | | | 409/137 |
| 2019/0375067 | A1 | * | 12/2019 | Berrocal | B23Q 3/1554 |
| 2022/0203559 | A1 | * | 6/2022 | Lenglachner | B25J 19/0033 |
| 2023/0043426 | A1 | | 2/2023 | Luppold et al. | |

FOREIGN PATENT DOCUMENTS

| | | |
|---|---|---|
| EP | 1127655 B1 | 8/2001 |
| EP | 2716418 B1 | 4/2014 |

OTHER PUBLICATIONS

European Search Report issued in corresponding European Application No. 22180803.3, with English translation of categories of cited documents, dated Dec. 16, 2022 (10 pages).

* cited by examiner

TOOL INTERFACE AND ROBOT WITH SUCH A TOOL INTERFACE

CROSS-REFERENCE TO RELATED APPLICATION

This claims priority from European Application No. 22180803.3, filed Jun. 23, 2022, the disclosure of which is hereby incorporated by reference in its entirety.

TECHNICAL FIELD

The invention relates to a tool interface and robot with such a tool interface.

A tool interface according to the invention is used to fit a robot tool to a robot arm in a releasable and changeable manner. In this case, a generic tool interface has an abutment face for abutting an abutment face of a corresponding interface at the side of the tool. Additionally, the tool interface has a coupling device, by means of which the tool interface on the robot arm can be mechanically fixed to each other at a corresponding interface of the tool and in particular locked to each other.

BACKGROUND AND SUMMARY

It is known to provide a discharge device at the interface. Such a discharge device generally has a nozzle opening, through which compressed air is discharged during the coupling or uncoupling operation of the tool interface in the form of an air blast in order to eliminate occurrences of contamination in the region of the abutment face because they make a reliable connection and precise operation of the robot more difficult.

It has been established that the cleaning which can be achieved with known discharge devices is sometimes not in a position to achieve the desired discharge action so that contamination remains. Although it is possible to increase the cleaning quality via discharge devices with a plurality of compressed air channels and nozzle openings, this is associated with a high complexity during the installation of the tool interface and increases the fitting times considerably.

The invention provides a tool interface of the type described in the introduction which achieves an improved discharge action.

To this end, a tool interface according to the invention is primarily proposed. The invention further also comprises the set of this tool interface and a corresponding interface on the tool and the robot, on the robot arm of which the tool interface is provided. An operating method with regard to operating the robot is further included.

A tool interface has an abutment face for abutting a corresponding abutment face of the tool. Although it is possible to configure these abutment faces so as to correspond to each other in a non-planar manner, a planar configuration of the abutment face is considered to be advantageous. Preferably, at least 80% of a contact face is located in a common abutment plane. The abutment face is preferably an at least mainly metal abutment face. In a peripheral region of the abutment face, a circumferential seal which is provided for abutment against the abutment face of the tool may be provided and the introduction of dirt during operation is made harder.

The seal particularly preferably also surrounds the electrical contact faces for transmitting data and/or electrical energy. In a coupled state of the tool interface, therefore, the contact faces are protected by the seal against contamination from the exterior.

The tool interface has a coupling device for mechanically coupling the tool to the tool interface. Preferably, this coupling device has at least one conical orientation pin, or an orientation pin which tapers in another manner, which engages in a corresponding receiving member which is provided thereon during connection to the tool. In a particularly preferable manner, two such orientation pins are provided. Alternatively, the orientation pins can also be provided on the tool so that the tool interface on the robot arm has corresponding receiving members instead. In particular in addition to this, the coupling device preferably has a locking mechanism for connecting the tool to the tool interface in a positive-locking manner. This locking mechanism can particularly have bar members which are displaced transversely relative to the insertion direction after the tool has been positioned at the tool interface and are thereby engaged in a corresponding receiving member in the tool. In a central locking extension piece, the bar members may particularly be balls which are pressed by a control pin radially outwards and therefore into at least one receiving member at the tool side.

The tool interface according to the invention has a discharge device for producing a discharge air flow in the region of the abutment face. The invention primarily relates to the particular configuration of this discharge device.

There is provision for the discharge device to have a plurality of nozzle openings for discharging the discharge air flow. The compressed air is discharged by means of the at least two and preferably at least four nozzle openings into different regions of the abutment face and thereby ensures that the entire abutment face is freed from contaminations. The different nozzle openings can discharge the compressed air flow vertically relative to the abutment face or, conversely, also at an angle. An angled and consequently orientated discharge is particularly advantageous when particular regions of the interface and in particular of the abutment face are in particularly great need of cleaning. This may be the case, for example, for electrical contact faces, by means of which control signals or electrical power is/are transmitted to the tool.

The plurality of nozzle openings are supplied with compressed air by a common compressed air connection. The complexity for producing the compressed air connection is therefore comparatively small. It is simply necessary to connect a supply hose to a location on the tool interface, in particular a base member of the tool interface, in order thereby to supply the plurality of nozzle openings.

There is preferably provision for the tool interface to have the already mentioned base member. This base member is preferably made from metal and forms at least a portion of the abutment face of the tool interface. In principle, it is possible to provide the nozzle openings directly by separate holes in this base member.

It is preferable, however, for the tool interface to have a nozzle member which is separate from the base member and through which preferably a plurality of nozzle openings extend, and consequently at least two nozzle openings. This nozzle member is fitted to the base member and is supplied with compressed air by at least one air channel in the base member. The nozzle member can also be made from metal. However, it is preferable to have a configuration in which the nozzle member is made from plastics material, particularly polyoxymethylene or polyurethane. The nozzle member is preferably in the form of a planar nozzle plate with a substantially uniform wall thickness. Particularly preferably, the thickness of the nozzle plate may be 15 mm or less, in particular 10 mm or less.

There is preferably provision for the base member to have at least one recess in the region of the abutment face. This abutment face is covered by the mentioned nozzle member. Compressed air which is supplied to the recess can consequently be introduced inside the recess to the plurality of nozzle openings and be discharged here.

The recess preferably performs a double function. In addition to distributing the compressed air via the recess, at least one screw hole is preferably provided therein. This screw hole extends through the base member so that the fixing screws which are introduced there are used for fixing to a flange of the robot arm at the side, opposite the abutment face, of the base member.

Preferably, there is provided a common recess, in which a plurality of screw holes are provided, in particular at least three screw holes. In this instance, the screw holes can be arranged in particular in a circular shape and can be arranged together in a circular or circle-segment-shaped recess.

The nozzle member can be fixed to the base member in different manners. In this case, it should be taken into account that the nozzle member is pressed away from the base member as a result of the compressed air and the fixing member must be in a position to prevent the separation.

A preferred method makes provision for the nozzle member to be connected to the base member via a screw connection. In this case, the screws are preferably screwed into the base member from the exterior through the nozzle member. Preferably, at least three screws are provided, particularly preferably at least four.

The nozzle member is preferably located at least partially in the described recess. It is particularly preferable for the nozzle member to be adapted to the recess in such a manner that an outer side of the nozzle member forms a uniform plane with face portions, which surround the recess, of the abutment face. The outer side of the nozzle member is a portion of the abutment face in such a configuration.

The arrangement of the nozzle member in the recess can also serve to secure the nozzle member to the base member. To this end, there may be provision for the nozzle member to be retained in the recess in a frictionally engaging manner by having at least partially an excess dimension with respect to the recess. Another possible method provides for the nozzle member to be retained in the recess in a positive-locking manner. This is particularly possible by the recess having a geometry, the cross section of which at least partially tapers in the direction of the abutment face, for example, in the manner of a dovetail. The nozzle member is inserted therein and secured so as to prevent separation by excess dimensions with respect to the narrowest location of the recess. The dovetail-like shape or a different formation, which tapers towards the abutment face, of the recess is further advantageous because it promotes an inclination of the nozzle member for the automatic sealing of the gaps between the nozzle member and the base member. If the nozzle member is pressed outwards by compressed air at the inner side thereof, this closes the gaps and the air is substantially completely discharged through the nozzle openings in a correct manner.

A configuration, in which the nozzle member is secured both in the manner described above in a positive-locking manner by the shape of the recess and additionally by means of screws is particularly preferable.

The recess preferably has at least one support face for supporting the nozzle member. In particular, the recess can be configured in such a manner that such support faces and the above-described screw holes are provided in alternation. Consequently, a support face is provided between two screw holes in each case.

So that the air can be introduced inside the recess to the different nozzle openings, there may be provision for an air guiding groove, through which the compressed air propagates, to be introduced into the mentioned support faces. Alternatively or additionally, there may be provision for the nozzle member to have at an inner side an air guiding groove, through which the air can flow to the nozzle openings.

As already mentioned in above, the invention also relates to a robot having a tool interface of the type described. This robot has a robot arm, at the distal end of which the tool interface is provided. The tool can consequently be guided to a work position by means of the robot arm and be moved at that location. Furthermore, the robot arm can be guided into the region of a change-over station, in which a tool is uncoupled and subsequently a new tool is coupled.

In particular, the use of the described tool interface is advantageous if the tool is provided as a tool for chip-removing processing, in particular a drilling tool. During the chip-removing processing and in particular during the drilling, there is produced a high loading by dust and chips which can be advantageously counteracted by the discharge device according to the invention.

The tool preferably has an interface which corresponds to the tool interface, wherein it preferably also has a base member which provides the abutment face for the tool interface.

In addition to the tool interface and the robot, the invention also relates to a corresponding method, in which during a coupling operation, in the context of which a tool is connected to the tool interface, or during an uncoupling operation, in the context of which a tool is disconnected from the tool interface, compressed air is introduced via the plurality of nozzle openings into an intermediate region between the tool interface and the tool. The compressed air supply is preferably carried out in this case in an intermediate state, in which the two-sided abutment faces are spaced apart from each other only by a small amount, preferably by less than 10 cm, particularly preferably by less than 2 cm. The air being discharged is thereby redirected and passes outwards through the gap between the abutment faces, wherein it draws dust and chips with it and consequently cleans the abutment faces.

BRIEF DESCRIPTION OF THE DRAWINGS

Additional advantages and aspects of the invention will be appreciated from the claims and the following description of preferred embodiments of the invention which are explained below with reference to the Figures. In the drawings:

DETAILED DESCRIPTION

Figure 1:
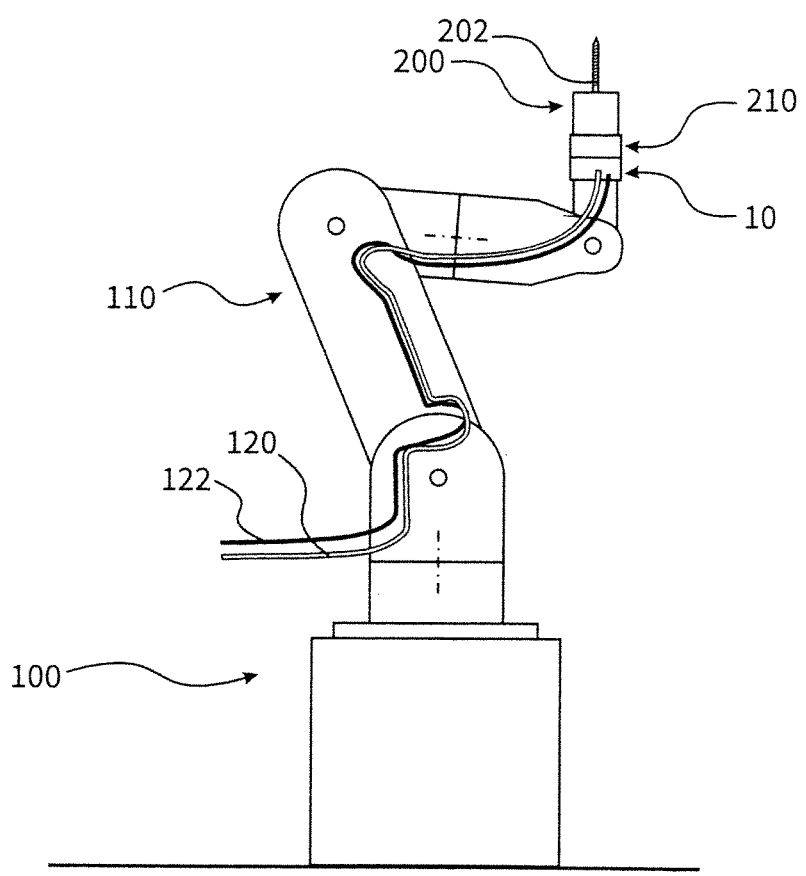
FIG. 1 generally shows a robot according to the invention.

FIG. 1 shows a robot 100 which has a robot arm 110, by means of which a tool 200 can be flexibly moved and can particularly be brought into a work position and can be moved to a change-over station in order to change tools. In this case, the tool 200 is in the form of a drilling tool and has a drill 202, by means of which holes can be introduced into surfaces. Supply lines 120, 122 extend along the robot arm 110, wherein the supply line 122 is provided for transmitting electrical energy and/or electrical signals. The supply line 120 is a compressed air line, by means of which compressed air is supplied to the tool interface 10 on the robot in order to purge the interface of contamination and consequently to ensure a reliable tool change and operation free from disruptions.

Figure 2:
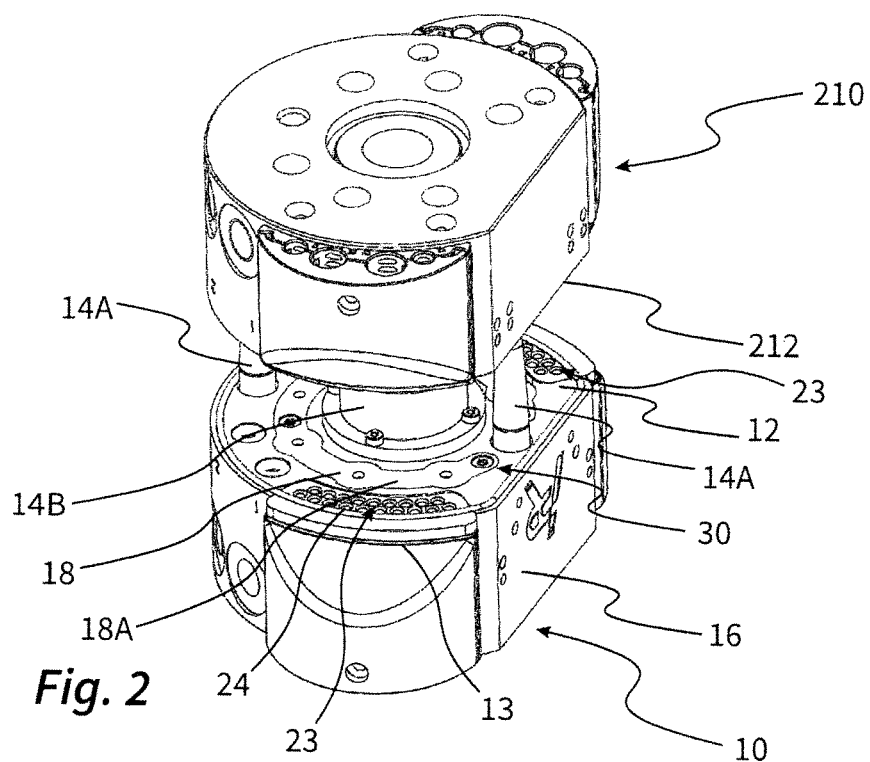
FIG. 2 shows a tool interface on the robot and a corresponding interface on a tool.

FIG. 2 shows the tool interface 10 on the robot and the corresponding counterpart of the interface 210 on the tool as a general view, wherein in the state of this illustration the interfaces 10, 210 are not connected to each other.

At the side of the tool interface 10 which is provided on the robot arm 110, a metal base member 16 is provided. The face 12, which is directed upwards in FIG. 2, of the base member 16 forms an abutment face 12 for planar abutment against a corresponding abutment face 212 of the interface 210 on the tool. In the region of this abutment face, there is provided a coupling device which comprises a plurality of part-elements, that is to say, two conical orientation pins 14A which are introduced into corresponding recesses in the interface 210, and a central locking mechanism 14B, on which there are provided radially extensible locking members in the form of balls 14C which are pressed outwards after the tool 200 is connected in order to obtain a positive-locking connection with respect to the interface 210 on the tool.

In the region of the abutment face 12, two areas 23 with electrical contact faces 24 are provided. They are provided in order to transmit electrical energy and to transmit control signals to the tool 200 and, in a manner not illustrated in greater detail, are connected to the supply line 122 on the robot arm 110. In a manner not illustrated in greater detail, corresponding contacts are provided opposite on the interface 210 on the tool.

The abutment face 12 is provided at the periphery with a seal 13 which prevents, after the tool 200 has been connected to the tool interface 10, dirt or chips from being able to be introduced into an intermediate space between the abutment faces 12, 212 and into the region of the contact faces 24. In order to perform this function, however, it is necessary for chips or contamination not to be already present on the abutment faces 12, 212 during connection. In order to prevent this, a discharge device 30 is provided.

Figure 3:
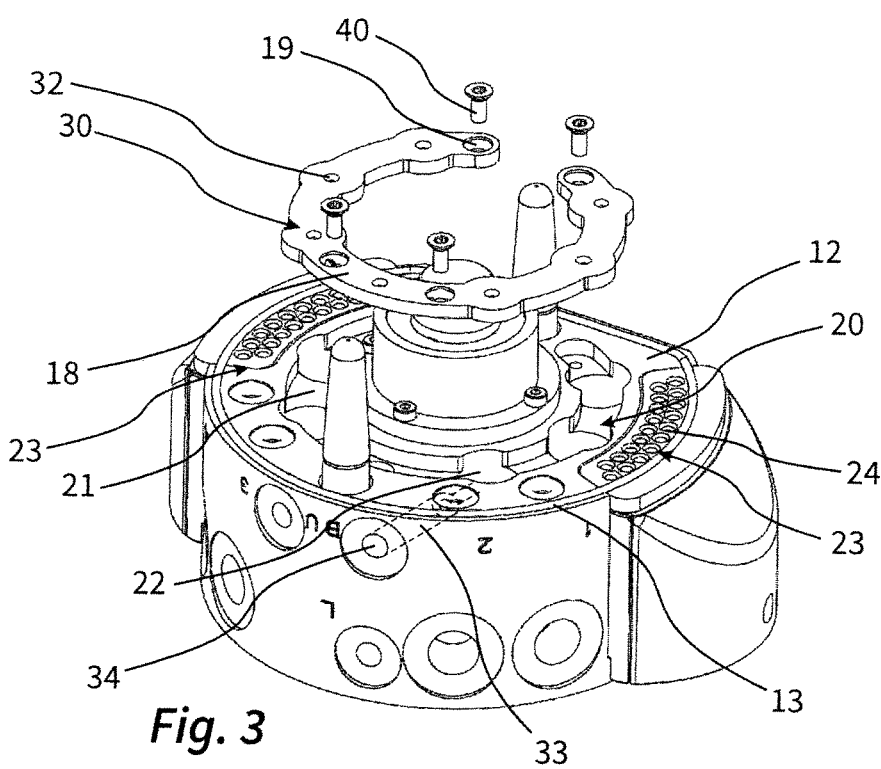
FIG. 3 shows the structure of a discharge device at the side of the tool interface on the robot together with nozzle openings for discharging compressed air.

With reference to FIG. 3, it can be seen that a recess 20 is provided in the region of the abutment face 12 on the base member. This recess 20 which is approximately in the form of a circular arc which spans approximately 300° comprises different part-regions, that is to say, six screw holes 22, in the region of which screws are provided in a recessed manner in order to secure the base member 16 to a flange of the robot arm 110, and intermediate regions at the other side and between the screw holes 22, which provide support faces 21 which are, however, set back with respect to the abutment face 12.

A nozzle member 18, the outer contour of which substantially corresponds to the contour of the recess 20, is inserted in the recess 20 which is formed in this manner in the manner which can also be seen in FIG. 2. As can be seen with reference to FIG. 2, this nozzle member 18 is inserted into the recess 20 in such a manner that the outer side 18A thereof terminates in a substantially flush-mounted manner with the surrounding portions of the abutment face 12. In the inserted state, the nozzle member 18 protects the screws. If the tool interface 10 is intended to be separated from the robot arm 110, the nozzle member 18 is removed so that subsequently access to the fixing screws is provided.

However, the main object of the nozzle member 18 is the provision of a total of six nozzle openings 32 which belong to the discharge device 30 and through which compressed air can be discharged out of the recess 20 into a gap between the abutment faces 12, 212. This compressed air is suitable for blowing away from this location all the chips and other pieces of contamination which are located in the region of the abutment faces 12, 212 and particularly in the region of the contact faces 24.

As can be seen with reference to the screws 40 and the corresponding screw holes 19 in the nozzle member 18, the nozzle member 18 is securely screwed correctly to the base member 16.

Figure 5:
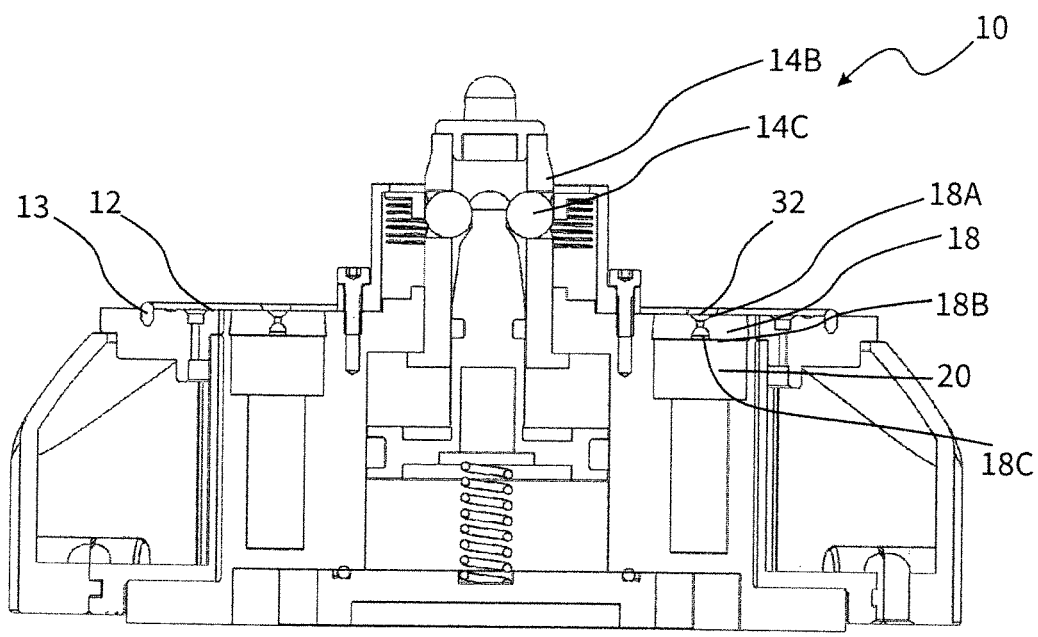

In order to be able to withstand the excess pressure which is produced during the supply of compressed air in the recess 20, the nozzle member 18 may additionally have a cross section which tapers upwards in the direction of the abutment face 12 in the manner which can be seen in FIG. 5. In a manner corresponding thereto, the recess 20 itself can also have a tapering shape in this region. This results in the dovetail geometry visible in FIG. 5. At high pressure in the recess 20, the nozzle member 18 is pressed upwards as a result of this geometry and in this case closes gaps between the nozzle member 18 and the base member 16. The compressed air can accordingly be discharged only through the nozzle openings 32.

Figure 4:
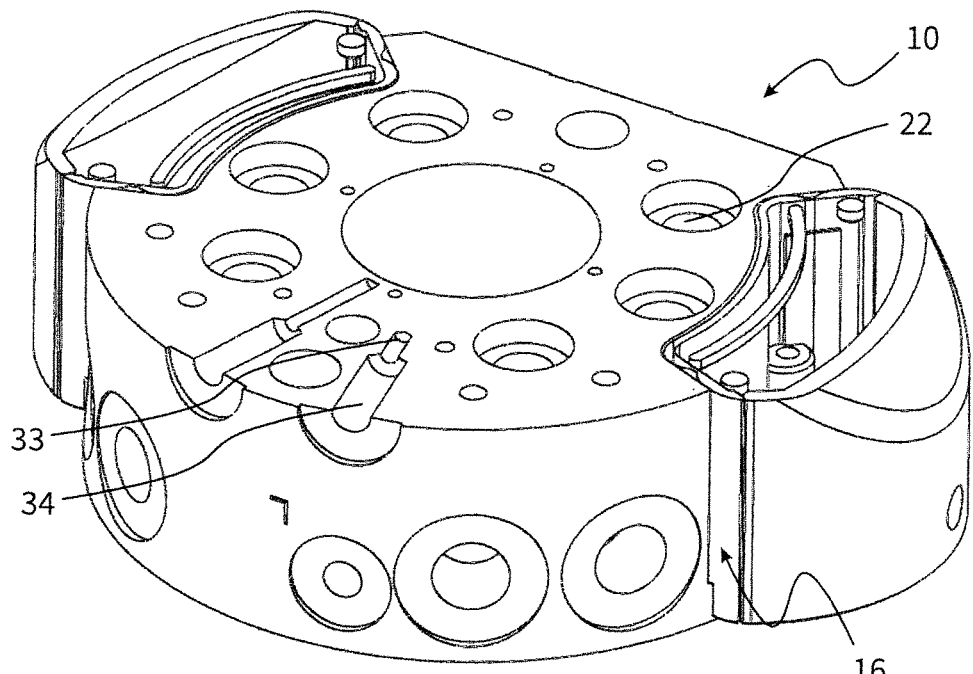
FIGS. 4 and 5 show as sectioned illustrations the tool interface on the robot and the path of the compressed air to the nozzle openings.

The supply of the compressed air is carried out via a single compressed air connection 34, which is provided at the outer side of the base member 16. This is shown in FIG. 4. From here, the compressed air flows through a compressed air channel 33 into the recess 20. The opening of the compressed air channel 33 into the recess 20 can be seen in FIG. 3.

So that the compressed air can also flow onwards in the region of the support faces 21 inside the recess 20 and can consequently reach all the nozzle openings 32, grooves can be provided in the support faces 21. Alternatively or additionally, an air guiding groove 18C can also be provided at an inner side 18B of the nozzle member 18. This can be seen in FIG. 5.

The nozzle openings 32 can all have a uniform geometry. In order to compensate for the different geometrically caused resistance in the air supply line to the air nozzles, however, it may also be advantageous to provide the nozzle openings with different clear cross sections or geometries in order to compensate for the increased resistance during the supply of air. In this manner, it is possible to obtain a substantially uniform air flow at all nozzle openings in spite of this non-uniform air resistance.

The nozzle openings can discharge the compressed air in a perpendicular manner with respect to the abutment face. However, it may also be advantageous to provide the nozzle openings with a geometry which is positioned obliquely in order to direct the air selectively in a specific direction. This is particularly advantageous in order to clean the electrical contact faces 24 for transmitting electrical power or electrical signals. If this is the case, some or all of the air nozzles are preferably orientated in such a manner that they discharge the compressed air in the direction of these contact faces.

The invention claimed is:

1. A tool interface for coupling a tool to a robot, the tool interface comprising:

an abutment face for abutting a corresponding abutment face of the tool;

a coupling device for mechanically coupling the tool to the tool interface;

a discharge device for producing a discharge air flow in a region of the abutment face, the discharge device having a plurality of nozzle openings for discharging the discharge air flow, the plurality of nozzle openings being supplied with compressed air by a common compressed air connection of the tool interface;

a base member, the common compressed air connection being provided on the base member; and a nozzle member fitted to the base member and having the plurality of nozzle openings extending therethrough;

wherein the base member has at least one recess adjacent the abutment face, the at least one recess allowing the discharge air flow to flow to the plurality of nozzle openings of the discharge device;

wherein at least one screw hole is provided in the at least one recess, the at least one screw hole configured to receive at least one fixing screw to fix the tool interface to a robot arm via the at least one fixing screw;

wherein the nozzle member covers the at least one recess; and wherein the at least one recess allows for space for the at least one fixing screw and the nozzle member must be removed from the at least one recess to allow access to the at least one fixing screw in the at least one recess such that the at least one fixing screw is capable of being removed from the at least one screw hole only after the nozzle member is removed from the at least one recess.

2. The tool interface according to claim 1, wherein the nozzle member is located at least partially inside the at least one recess in the base member.

3. The tool interface according to claim 2, wherein:
the nozzle member is retained in the at least one recess in a frictionally engaging manner; and/or
the nozzle member is retained in the at least one recess in a positive-locking manner by a shape which tapers in cross section in a direction of the abutment face; and/or
the nozzle member is adapted to the at least one recess such that an outer side of the nozzle member forms a uniform plane with face portions of the abutment face, the face portions surrounding the at least one recess.

4. The tool interface according to claim 1, wherein:
the nozzle member is made from a plastics material; and/or
the base member is made from metal.

5. The tool interface according to claim 4, wherein the plastics material of the nozzle member comprises polyoxymethylene or polyurethane.

6. The tool interface according to claim 1, wherein:
at least one support face for supporting the nozzle member is disposed inside the at least one recess, the support face including therein an air guiding groove through which the compressed air can flow to the plurality of nozzle openings; and/or
the nozzle member has at an inner side an air guiding groove through which the compressed air can flow to the plurality of nozzle openings.

7. The tool interface according to claim 1, wherein the nozzle member is a planar with a substantially uniform wall thickness and the plurality of nozzle openings having an extent direction which is oblique with respect to a normal vector of the nozzle member.

8. The tool interface according to claim 1, wherein the tool interface has electrical contact faces for transmitting data and/or electrical energy to the tool when coupled to the tool interface.

9. The tool interface according to claim 8, further comprising a seal, the abutment face being surrounded externally by the seal.

10. The tool interface according to claim 9, wherein the electrical contact faces for transmitting data and/or electrical energy are provided on the abutment face such that the electrical contact faces are surrounded externally by the seal and are protected in a connected state by the seal against contamination from an exterior environment.

11. The tool interface according to claim 8, wherein:
the electrical contact faces are provided in a region of the abutment face; and/or
at least one of the plurality of nozzle openings is orientated in a direction of the electrical contact faces.

12. The tool interface according to claim 1, wherein:
the coupling device comprises at least one conical orientation pin, or the coupling device comprises at least one receiving member for a conical orientation pin; and/or
the coupling device comprises a locking mechanism for connecting the tool to the tool interface in a positive-locking manner.

13. The tool interface according to claim 1, wherein at least two of the plurality of nozzle openings have a mutually different geometry and/or a mutually different minimum cross section.

14. The tool interface according to claim 1, wherein:
the screw holes boing are arranged in a circular shape; and/or
the nozzle member is connected to the base member by a screw connection.

15. A robot comprising:
a movable robot arm having a distal end; and
a tool interface according to claim 1 disposed at the distal end of the robot arm for coupling a tool to the robot.

16. The robot according to claim 15, wherein the tool is for chip-removing processing fitted to the tool interface, and the tool has a tool interface configured in a corresponding manner to the tool interface on the robot arm.

17. A method of operating the robot according to claim 15, the method including the following steps:
during a coupling operation, in which the tool is connected to the tool interface, introducing the compressed air via the plurality of nozzle openings into an intermediate region between the tool interface and the tool; and/or
during an uncoupling operation, in which the tool is disconnected from the tool interface, introducing the compressed air via the plurality of nozzle openings into an intermediate region between the tool interface and the tool.

18. The robot according to claim 15, wherein the tool comprises a drilling tool.

* * * * *